Aug. 6, 1957     H. LINDARS     2,801,819
AUTOMATIC WEIGHING APPARATUS

Filed Sept. 7, 1950     5 Sheets-Sheet 1

INVENTOR
Herman Lindars
BY
Peck & Peck
ATTORNEY

Aug. 6, 1957     H. LINDARS     2,801,819
AUTOMATIC WEIGHING APPARATUS
Filed Sept. 7, 1950     5 Sheets-Sheet 2

Inventor
Herman Lindars
By Pech & Pech
Attorneys

Aug. 6, 1957

H. LINDARS 2,801,819

AUTOMATIC WEIGHING APPARATUS

Filed Sept. 7, 1950

INVENTOR
Herman Lindars

BY
Peck & Peck
ATTORNEY

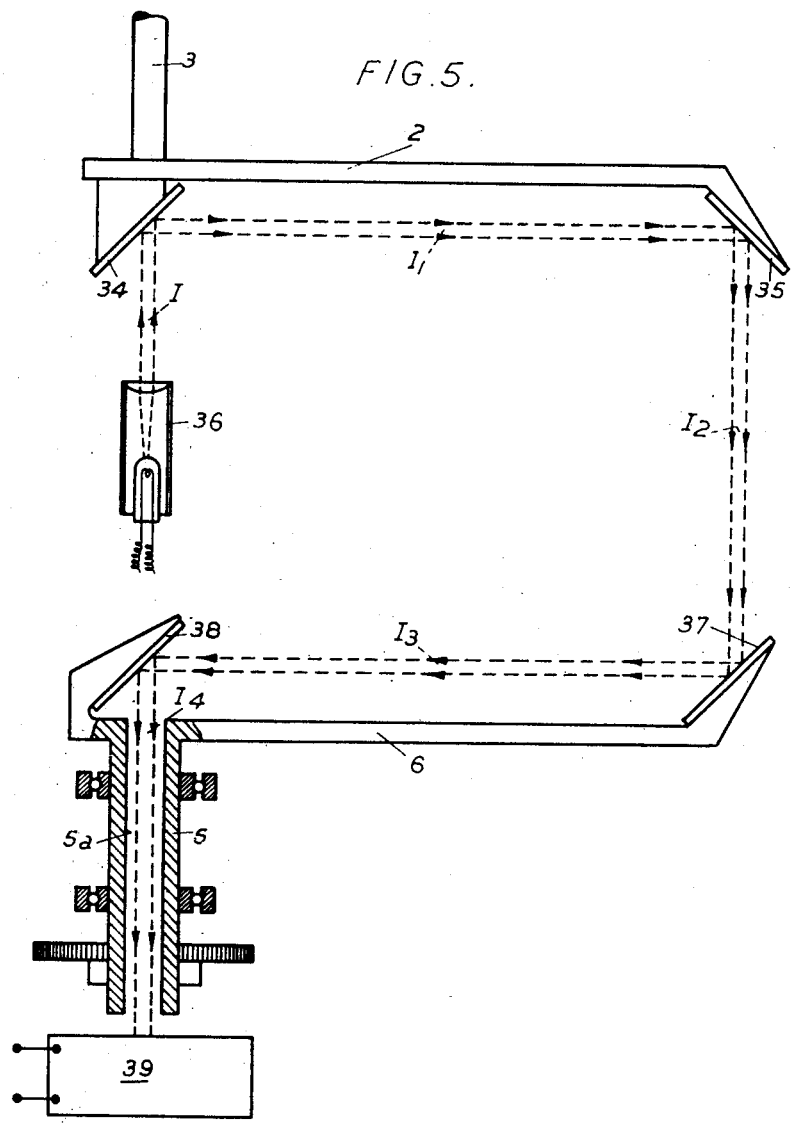

United States Patent Office 2,801,819
Patented Aug. 6, 1957

2,801,819

AUTOMATIC WEIGHING APPARATUS

Herman Lindars, Sheffield, England

Application September 7, 1950, Serial No. 183,481

12 Claims. (Cl. 249—46)

This invention concerns means for automatically weighing out a predetermined quantity of material, and has for an object to provide means whereby a predetermined weight of material may be preselected and the weighing operation automatically carried out. Another object of the invention is to provide means whereby successive quantities of different materials may be weighed into a common receptacle.

According to the present invention, means for automatically delivering a predetermined weight of material comprises a weighing mechanism having a load carrier for receiving the said weight of material, and a weight-measuring member whose position relative to a zero position is a function of the weight of material on the load carrier, and a co-operating setting member movable in accordance with the value of the predetermined weight and carrying an electrical contact operable by the measuring member when the two said members are brought to positions corresponding to the same weight, means for delivering material to the load carrier, and means controlled by the contact on the setting member for interrupting the delivery of material into the load carrier when the desired weight thereof has been delivered.

Preferably, the weight responsive member is constituted by a rotary arm mounted on a spindle of the weighing mechanism and the setting member is mounted co-axially with the said spindle.

Advantageously, the position of the setting member is controlled by mechanism which generates electrical impulses representing fixed increments of weight as the setting member is moved, and means is provided for counting the impulses and for interrupting the operation of the setting member driving means when a desired number of impulses has been counted.

Where a plurality of separate weighing operations, involving different materials in equal or different quantities, constitute a weighing sequence, which may be repetitive, apparatus according to the invention conveniently includes means for presetting the order of weighing of the separate materials and their respective quantities, and automatic control means for determining the end of one individual weighing operation and for initiating the next. Such automatic control means may comprise a "chart" or like programme selecting device and associated control means of a similar nature to those described in the specification of my co-pending United States patent application No. 133,203, filed December 15, 1949 for Automatic Operation Controller, now Patent 2,656,109.

If it is necessary or desirable to locate the setting arm and its driving mechanism at a distance from the weighing mechanism, a synchronous transmission system may be interposed between the measuring member and the setting member. Furthermore, in cases where the automatic control mechanism is required to impose no restraint on the weighing mechanism, an optical transmission system may be used to indicate the desired coincidence in the positions of the measuring and setting members. In this latter arrangement, a photocell may be arranged to be illuminated when the desired weight of material has been delivered to the load carrier of the weighing mechanism, this photocell being adapted to trigger the associated control mechanism for interrupting delivery of the material.

Apparatus according to the present invention may have a variety of forms according to the function which it is required to fulfill. Thus, a first form of the apparatus is designed for the individual weighing of a predetermined quantity of material, each weighing operation being separate and distinct from every other weighing operation, and the predetermined quantity of material being variable at will between successive weighings.

Alternatively, the apparatus according to the invention may be adapted to carry out a predetermined sequence of weighings of different materials in accordance with a given programme.

Whilst apparatus according to the invention may have a wide variety of different practical embodiments, certain typical constructions will now be described by way of illustrating the salient features of the invention, reference being made to the accompanying drawings in which:

Fig. 5 is part sectional layout of an alternative arrangement of setting arm embodying an optical system for determining the position of coincidence with the measuring arm.

Figure 1:
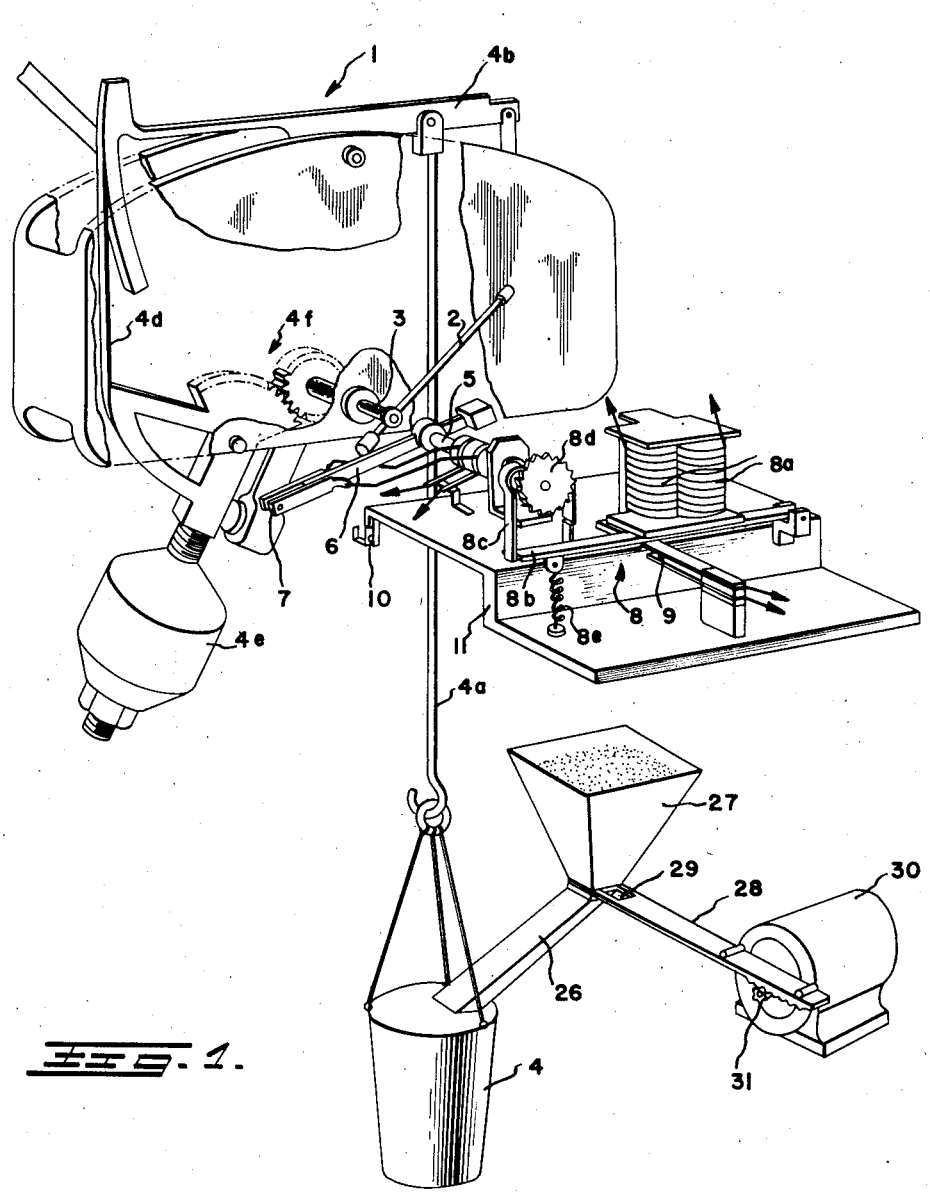
Fig. 1 is a schematic perspective view of weighing apparatus adapted for either single or sequential weighings, with parts thereof broken away to illustrate the weighing mechanism of the apparatus.

In the form of apparatus shown in Fig. 1, the weighing mechanism which is indicated in its entirety by the reference numbered 1, is provided with a radial arm 2 mounted on a rotary spindle 3. I provide a load carrying receptacle 4, the angular displacement of the radial arm being proportional to the weight in the load carrying receptacle, the radial arm thus constitutes a weight measuring member. The load carrying receptacle 4 is connected by a rod 4a with the weigh-beam 4b of the weighing mechanism 1. The other end of the weigh beam 4b is connected by a flexible band 4d to the balance weight 4e of the weighing mechanism. The movement of the balance weight 4e is transmitted by gearing indicated generally by reference character 4f to the spindle 3.

A further spindle 5 is mounted coaxially with the spindle 3 and this spindle 5 carries a setting arm 6 located in a plane adjacent the plane of rotation of the weight measuring arm 2, and provided on one end thereof with a pair of electrical contacts 7 which are engageable by the measuring arm 2 when the two arms are in a position of angular coincidence. It is preferred to arrange that the contacts 7 when thus engaged are actuated to circuit closing position.

The spindle 5 is rotated by a convenient form of motor (shown as a step by step motor) indicated generally by the numeral 8. The motor may comprise electro-magnets 8a, an armature 8b which is caused to vibrate by the electro-magnets. On the outer end of the armature I fix an upstanding pawl 8c positioned to operate a ratchet wheel 8d which is fixed on the end of spindle 5 to cause rotation thereof and consequent movement of setting arm 6. It will be observed that the armature is biased downwardly by means of a spring 8e fixed thereto and extending to a table 11 which mounts the motor and certain other parts of the apparatus.

Electrical contacts 9 are mounted on table 11 in position thereon to be engaged by armature 8b as it is vibrated. The opening and closing of contacts 9 provides electrical impulses at regular increments of load in the weighing receptacle 4, as will become apparent as this description proceeds. These impulses are counted in a counting mechanism (to be described) on which a pre-determined weight of material has been pre-set in terms of the corresponding number of such impulses, and when the counting mechanism has counted this number of impulses an electrical circuit is completed which interrupts the supply to the motor 8 and also operates mechanism for effecting the feed of material into the weighing receptacle 4.

As the load in the receptacle 4 increases, the measuring arm 2 is rotated by means of the weighing mechanism and spindle 3 until it comes into coincidence with the setting arm 6 and closes the contacts 7 mounted thereon. The electrical circuits completed by these contacts include mechanism for interrupting the flow of material to the receptacle 4, and hence the desired quantity of material is weighed out. Where each weighing operation is a single item, it is preferred to arrange that on closing of the contacts 7 carried on the setting arm 6, the motor 8 is energised to return the setting arm 6 to zero position in readiness for a subsequent weighing operation. When thus returned to zero, the setting arm 6 closes a pair of zero contacts 10 which are mounted on the frame structure 11 which carries the motor 8 and setting arm 6.

The receptacle 4 is located below the discharge end of a chute 26 which leads from the outlet of a hopper 27 containing the material to be weighed. The outlet from this hopper is controlled by a slide 28 having an aperture 29 which closes or opens the hopper outlet. This slide 28 is spring-loaded to the shut-off position shown in the figure, and can be moved to bring the aperture 29 into register with the hopper outlet by means of an electric motor 30 which drives the slide 28 through rack and pinion mechanism may be adopted for controlling the slide 28, such as a solenoid. The motor 30 is preferably arranged to remain energised throughout the period of feed of material from the hopper 27 so that, in the event of any failure in the power supply, the outlet from the hopper will automatically be cut off due to the return of the slide 28 under spring action.

Figure 2:
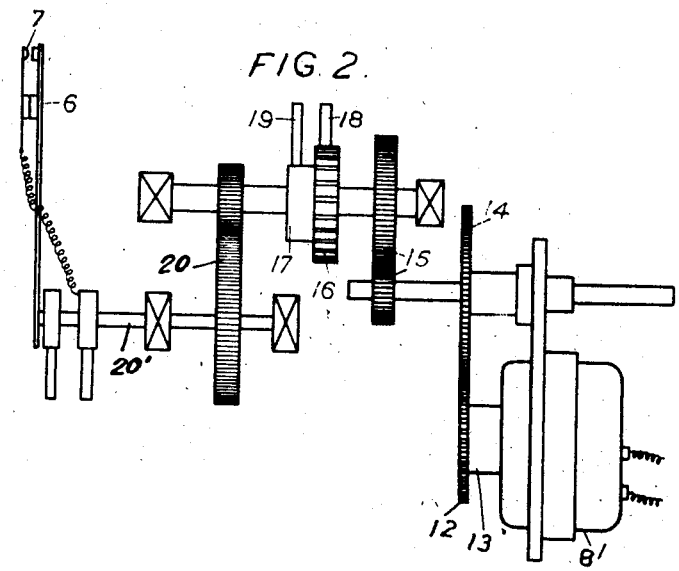
Fig. 2 is a schematic arrangement of an alternative form of setting arm control and impulsing mechanism.

Fig. 2 shows an alternative arrangement of setting arm driving motor and impulsing mechanism. In this arrangement, the motor 8' is of the rotary type having an output shaft (not shown) which is coupled to a driving pinion 12 through a clutch mechanism (indicated at 13) of any convenient known kind which is arranged to disengage on de-energisation of the motor 8'. Thus, for example, the clutch mechanism may be electro-magnetically operated, the winding being connected in parallel with the motor windings; or the armature of the motor 8' may be spring biased to move axially to a position in which it is unsymmetrically located with respect to the field so that, when the motor is energised, the armature is pulled axially into the symmetrical position and so effects engagement of the clutch 13. Such an arrangement of clutch ensures that the driving pinion stops immediately on de-energisation of the motor, and the armature is free to overrun under its own inertia without driving the setting arm 6 and so introducing an indeterminate factor in the position thereof.

The driving pinion 12 meshes with a gear 14 which in turn is coupled through gearing 15 to a commutator 16, the conducting segments of which are electrically connected to a slip ring 17. Brushes 18 and 19 engage the commutator 16 and slip ring 17 respectively, and are connected in series with an impulsing relay (shown at P in Fig. 3) as will be described more fully below. Further gearing 20 serves to couple the commutator 16 to the setting arm 6 through the spindle 20'. The ratio of the gearing 20 and the number of segments on the commutator 16 are selected so that the relay P of Fig. 3 is impulsed for every $n°$ of angular travel of the setting arm 6, the value of $n$ being chosen in accordance with the minimum increment of weight in the receptacle 4 to which it is required that the weighing apparatus should be sensitive.

Figure 3:
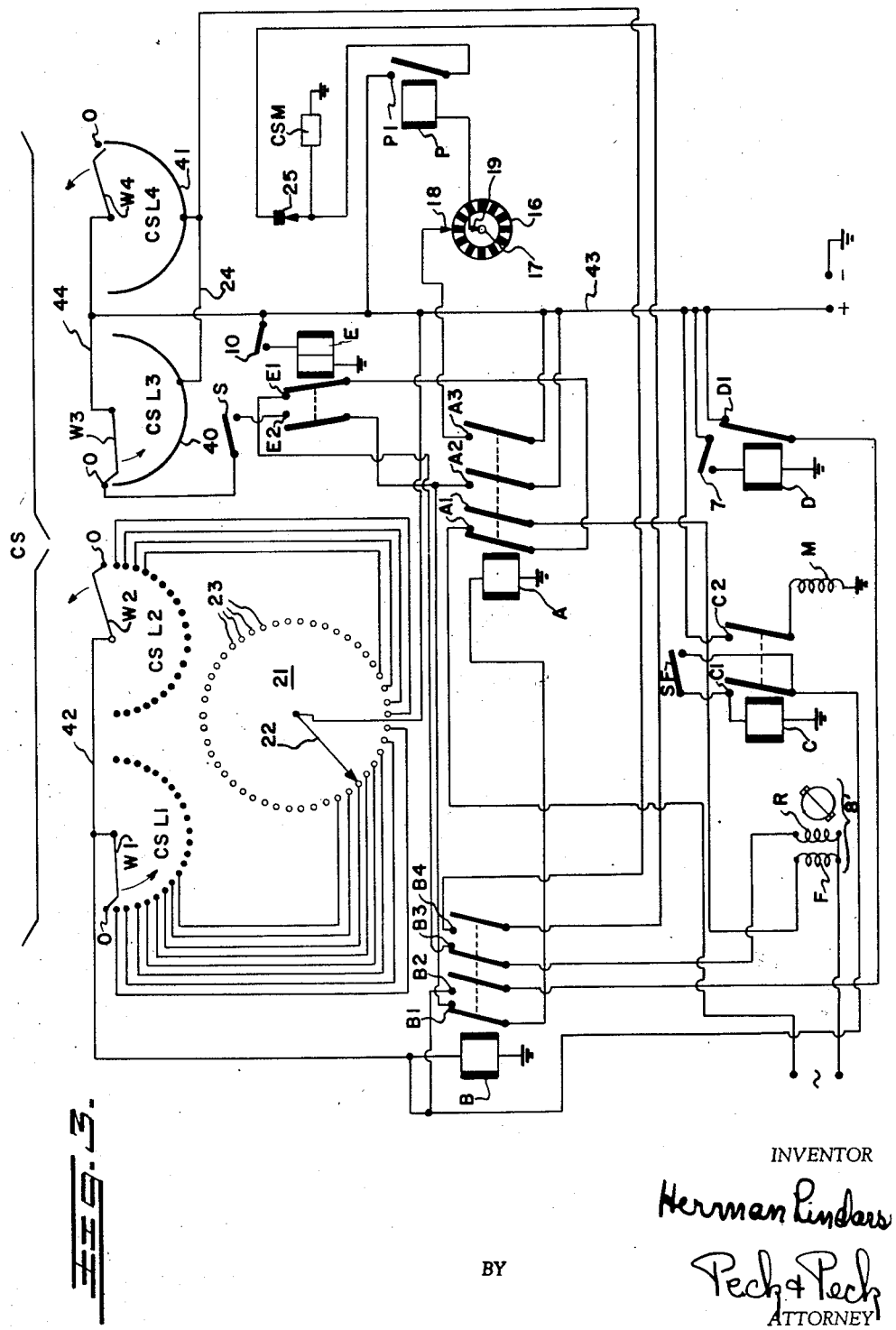
Fig. 3 is a circuit diagram of a form of automatic weighing mechanism for use where individual weighings are required.

Fig. 3 shows one form of circuit diagram for controlling a setting arm control and impulsing mechanism as illustrated in Fig. 2. It is to be understood that the mechanism of Fig. 2 when used in place of the setting arm control and impulsing mechanism of Fig. 1 will be mounted and supported on table 11 with spindle 20' coaxial with respect to spindle 3. The electric circuit of Fig. 3 consists essentially of a weight setting switch shown as a single-pole multi-contact rotary switch 21 having a plurality of contacts 23 and a manually adjustable contact arm 22 connected to the positive pole of a source of D. C. current. The circuit also includes a uni-selector switch which is schematically illustrated in Fig. 3 and is designated generally by reference character CS. The uni-selector switch is a unitary device consisting of four components, namely, the wiper contacts levels CSL1, CSL2, CSL3 and CSL4. The levels are of conventional type being in the form of semi-circular rows of radially disposed contacts, the levels being spaced apart in parallel planes with centers of the semicircles on a common axis about which the wiper arms rotate. These uni-selector switches are well known in the art and are almost universally used in automatic telephone exchanges. The levels CSL3 and CSL4 would normally have the same number and arrangement of contacts as levels CSL1 and CSL2 since it would be normal to purchase and use a proprietary design of uni-selector switch. The circuit also consists of a series of electromagnetic relays A, B, C, D, E and P. The electric motor 8' of Fig. 2 is represented schematically by its forward and reverse windings F and R, respectively, and an associated armature, while the commutator assembly of Fig. 2 is indicated at 16 and 17.

The number of contacts 23 on the rotor switch 21 is chosen in accordance with the number of increments of weight of material which the apparatus is designed to weigh. Each contact 23 is connected to a corresponding contact on one or other of the levels CSL1 or CSL2 of the uni-selector switch. A zero contact—numbered 0 on the drawing—on each of these levels is left on open circuit. All the contacts on the levels CSL3 and CSL4 except the zero contacts are strapped together, as at 40 and 41, and the two sets of strapped contacts are commoned by a connecting lead 24.

Each wiper contact level CSL1 and CSL2 is provided with a wiper W1 and W2, respectively, the wipers W1 and W2 being conducted together by a conductor 42 and to one side of the operating coil of a relay B the other side of which is grounded. The relay B controls the pairs of contacts B1, B2, B3 and B4 as will be hereinafter explained and the live side of the operating coil of relay B is also connected to the pair of contacts B2 which are operated by the relay, and then through normally closed contacts D1 to the positive main 43. The wipers W3 and W4 of levels CSL3 and CSL4 are directly connected to the positive main by the connecting lead 44.

The circuit also includes a driving magnet CSM and this driving magnet of the counter uni-selector is connected in series with the usual self-driving contacts 25 and normally open relay contacts B4 to the strapped contacts 40 and 41 on levels CSL3 and CSL4. The driving magnet CSM is also connected to positive main 43 through normally open relay contacts P1.

The driving motor 8' has its forward winding F connected to a convenient supply through the normally open side of a set of single pole change-over contacts A1, while the reverse winding R is connected through normally closed contacts B3 and E1 in series with the normally closed side of the change-over contacts A1. The brush 18 which bears on the commutator 16 driven by the setting arm motor 8' is connected to the positive main 43 through normally open contacts A3, while the brush 19 which bears on the slip ring 17 is connected to the operating coil of a relay P. The zero contact on the level CSL3 is connected to one side of a "set" push button S.

The contacts 7 on the setting arm 6 of the apparatus illustrated in Fig. 2 serve to connect the operating coil of the relay D to the positive main 43 when said contacts are closed upon arms 2 and 6 being coincident which relative positioning occurs when the load in receptacle 4 has reached a predetermined weight. The relay D is disconnected from the positive main when contacts 7 are in open position. As explained above when contacts 7 on the setting arm 6 are closed the motor 8' is energised to return it to zero in readiness for a subsequent weighing operation and when so returned the contacts 10 are closed by the setting arm 6 and these zero contacts 10 control the connection of relay E to the positive main 43. The relay E is that type of relay having a delayed release time and is known in the art as a "slugged" relay. Since the structure per se of this relay forms no part of the present invention it is not structurally illustrated, however, one conventional form of "slugging" on relays consists of a cylindrical coil with a straight iron core or band of copper or brass placed over a proportion of the winding and constituting a short circuited turn. The proportions of this ring or band determine the release delay period. The winding M of the motor shown at 30 in Fig. 1 is connected to the positive main 43 through normally open relay contacts C2.

The method of operation of the circuit is as follows: When the D. C. supply is switched on and assuming that the setting arm 6 is in its zero position closing the zero contacts 10, closing of the contacts 10 connects the relay E into the circuit and it is energised whereupon the contacts E1 and E2 which are controlled thereby are actuated to open and closed positions, respectively. The opening of normally closed contacts E1 prevents energisation of the reverse winding R of the setting arm driving motor 8', and this motor therefore remains stationary.

Assuming that a weight of 60 lbs. is to be fed from the hopper 27 of Fig. 1 into the receptacle 4, the arm 22 of the multiposition switch 21 is set to, say, the sixth contact and the "set" button S is then pressed. The purpose of this operation is to position the setting arm 6 in accordance with the weight of material to be discharged into the receptacle 4. On closure of the button contacts S, the positive main 43 is connected through lead 44, the wiper W3, contacts E2 which were closed when relay E was energised, the normally closed side of the make-before-break contacts A2, and the normally closed contacts B1 to the operating coil of the relay A, which is thereupon energised. This relay then operates the make-before-break contacts A2 to connect the positive main through the contacts B1 to the relay A, thus holding it in when the "set" button S is released. At the same time, the change-over contacts A1 are operated and the forward winding F of the motor 8' is energised. The motor then rotates the setting arm 6 away from the zero position and simultaneously drives the commutator 16. Since the contacts A3 in series with brush 18 on the commutator 16 are now closed, the circuit from the positive main to the coil of the relay P is intermittently energised causing the contacts P1 to be alternately closed and opened. The driving magnet CSM of the counting uni-selector is thus impulsed through its connection in the circuit with contacts P1.

As soon as the setting arm 6 moves away from the zero position, the zero contacts 10 open and de-energise the relay E which, after a short delay, opens the contacts E2 and renders any further operation of the "set" button S ineffective until the cycle thus initiated has been completed.

Each time that the contacts P1 open during the impulsing of the relay P by the commutator 16, the wipers W1, W2, W3, and W4 of the counting uni-selector move round one step. When six such steps have been completed—i. e., when the wipers have reached the sixth contact—the positive main is connected through the arm 22 of the weight setting switch 21 and the sixth contact on the level CSL1, and thence via the wiper W1 of that level to the relay B. This relay is then energised and is held in by its contacts B2. The closing of these contacts also connects the positive main to the make-before-break contacts C1, the result of this connection being described below.

When the relay B is energised, its contacts B1 are opened and the relay A3 released. The contacts A3 thereupon open and the relay P is no longer impulsed by the commutator 16. The contacts P1 resume their normally open position so that the driving magnet CSM of the uni-selector remains deenergised and no further movement of the wipers W1, W2, W3 and W4 takes place.

De-energisation of the relay A permits the changeover contacts A1 to resume their normal position in circuit with the reverse winding R of the motor 8'. Since the relay E has also been de-energised by the opening of the zero contacts 10, normally closed contacts E1 in the same circuit are made. Since, however, the relay B is energised, the normally closed contacts B3 are opened, so that the reverse winding R of the motor 8' does not become energised. Both windings of this motor are, therefore, de-energised and the motor stops. As already described in connection with Fig. 2 of the drawings, the setting arm 6 is immediately brought to rest on de-energisation of the motor 8', any over-run of the motor due to the inertia of its armature being ineffective to rotate the setting arm 6 due to the action of the clutch 13. As soon as the relay B is energised, contacts B4 connect the uni-selector driving magnet CSM through its self-driving contacts 25 to the strapped contacts on the levels CSL3 and CSL4 and thence through the wipers W3 and W4 to the positive main 43. The driving magnet CSM is thus impulsed, and the wipers "home" to their zero contacts. The relay B, however, remains energised through its hold-on contacts B2 and the normally closed contacts D1. The relay D which operates the latter remains de-energised until the contacts 7 on the setting arm 6 are closed, and this does not occur until the required weight of material has been discharged into the receptacle 4.

The setting arm 6 is now at rest in a position corresponding to the weight of material to be discharged from the hopper 27 into the receptacle 4. The feed of material into the receptacle can now be commenced, by closure of a "start feed" button SF. Closure of this button connects the operating coil of the relay C to the positive main through the normally closed side of the make-before-break contacts C1 and the closed contacts B2, D1 to the positive main. The relay thereupon closes. The make-before-break contacts C1 are thus operated to first complete the hold-on-circuit for the relay C and then break the circuit to the "start feed" button SF which can now be released. At the same time, the contacts C2 are closed to energise the winding M of the motor 30 which controls the slide 28, and the latter is moved to bring its aperture 29 into register with the feed hopper 27 so that feed of material commences into the receptacle 4.

The apparatus remains in this condition until the measuring arm 2 of the weighing mechanism which is carried on the pointer spindle 3 of the weighing mechanism 1 moves into the position of coincidence with the setting arm 6, indicating that the desired weight of material has been discharged into the receptacle 4. At this point the contacts 7 on the setting arm 6 are closed and the operating coil of the relay D is energised from the positive main. Contacts D1 are thereupon opened to release the relays B and C. Release of the latter breaks the circuit to the motor winding M so that the slide 28 is retracted by its loading spring to cut off the supply of material from the hopper 27 to the receptacle 4. Release of the relay B also allows the contacts B3 to reclose so that the reverse winding of the setting arm driving motor 8' is energised and the arm 6 is returned to its zero position in which it closes the zero contacts 10. The relay E is energized to switch off the motor 8' by opening the normally closed contacts E1 while the normally open contacts E2 connected in circuit between the relay A and the "set" button S are reclosed. The circuit has now been restored to its initial condition in readiness for a further weighing operation.

Where each weighing operation forms part of a sequence of such operations, which sequence may or may not be required to be repeated, and in which each separate operation involves the delivery of a different material in the same or different quantities by weight, the setting arm 6 is arranged to remain in its first position at the conclusion of the first weighing operation, instead of being returned to zero, and thence to be advanced by a further increment, corresponding to the weight of material involved in the next weighing operation, under the control of an automatic programme selecting apparatus by which the several materials and their weights involved in the successive operations are first set up according to a predetermined programme. Such apparatus may be of the general nature set out in the above-mentioned co-pending patent application No. 133,203, now Patent No. 2,656,109.

Figure 4:
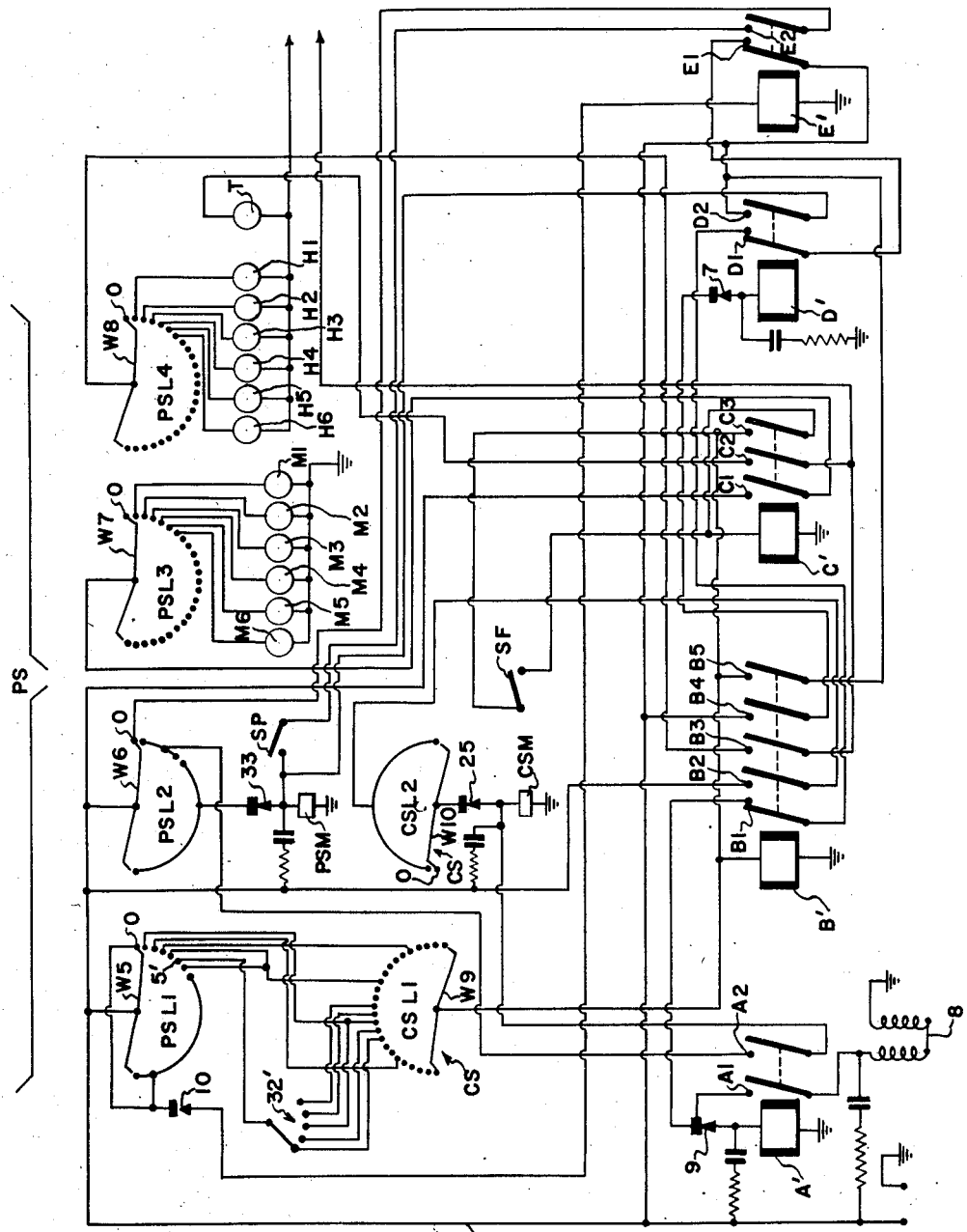
Fig. 4 is a circuit diagram of an automatic weighing mechanism for use where weighings are required to take place in accordance with a preselected programme.

One example of an embodiment of such apparatus is shown in Fig. 4, in which the programme selector mechanism is constituted by a four-level uni-selector switch designated in its entirety by reference character PS. This switch may be of the same general type as switch CS illustrated and described in connection with the circuit of of Fig. 3 of the drawings. This switch is stepped round at appropriate intervals by means of impulsing mechanism, the intervals being those occupied by successive weighing operations. Successive contacts on the level PSL1 of the uni-selector represent the successive weighing operations, and are connected to contacts on a corresponding level CSL1 of a similar uni-selector switch designated in its entirety by reference character CS which constitutes the counting mechanism. The contacts on the said level CSL1 of the counting uni-selector CS represent the successive minimum increments of load to which the apparatus is required to be sensitive. It will thus be seen that the appropriate weight of material can be allocated for each weighing operation in terms of a number of electric impulses produced by the motor 8 (Fig. 1) driving the setting arm 6. The circuit diagram of Fig. 4 will be described as controlling the setting arm control and impulsing mechanism illustrated in Fig. 1. Since the apparatus is adapted to feed and weigh different materials a plurality of motors 30 and hoppers 27 are used. There is one such motor for controlling the feed of material from each hopper, and it will be understood that each hopper may contain a different material. Successive contacts on the level PSL3 of the programme uni-selector PS are also connected to the respective motors, which I have designated in Fig. 4 as M1, M2, M3, M4, M5 and M6 which control the feed of material from a hopper in each separate weighing operation, thus ensuring that only one batch of material can be discharged at a time to the receptacle 4 (Fig. 1) or other convenient load-carrying member of the weighing apparatus.

In such automatic sequence weighing apparatus, it may be desirable to make provision for the variation between sequences of the weight of one of the materials to be delivered. For this purpose, the contact (shown as contact No. 5') on the first level PSL1 of the programme uni-selector representing the said material is connected through a multi-contact switch 32' to a corresponding number of contacts on the level of the counting uni-selector CS on which the weights of material are set up. The operator may thus manually select the quantity of this material which is to be delivered in any one sequence of weighings.

The circuit of Fig. 4 is arranged to effect the automatic sequence of weighings tabulated below:

| Hopper No.: | Weight |
| --- | --- |
| 1 | 10 units. |
| 2 | 5 units. |
| 3 | 20 units. |
| 4 | 15 units. |
| 5 | 8 to 12 units (variable). |
| 6 | 15 units. |

In the circuit illustrated in Fig. 4 the same reference characters have been used to designate similar elements to those of Figs. 1 through 3. The circuit of Fig. 4 operates in the following manner: With the setting arm 6 in zero position closing contacts 10 and with the D. C. supply switched on the relay E' is energised through contact No. 0 on level PSL1 of the programme uni-selector PS and the wiper arm W5 of that level and the closed contacts 10. The contacts E2 which are controlled by relay E' are thereupon closed to complete a circuit from the positive main 43 via the wiper W6 on level PSL2 and contact No. 0 of this level to a "start programme" button SP. When, therefore, this button is pressed, the programme uni-selector driving magnet PSM is energised and, on release of the button, the wipers are stepped round one contact. The circuit through the start programme button SP is then interrupted. Simultaneously, relay E' is released, and contacts E1 are reclosed.

Contact No. 1 on the level PSL1 is now engaged by its wiper, and the positive main is thus connected to the contact No. 10 on level CSL1 of counting uni-selector CS which corresponds with the weight—10 units in the table above—of material to be discharged from the first hopper. Since the relay contacts E1 have now been reclosed, the positive main is applied through normally closed contacts B1 and D1 and impulsing contacts 9, which are operated by the setting arm driving motor 8 of Fig. 1, to a relay A'. This relay is then energised to close its contacts A1 and A2. The relay A' has a delayed release time as explained in connection with relay E of Fig. 3 of the drawings.

Closure of contacts A1 energises the windings of the driving motor 8, and the contacts 9 are opened thereby. The relay A', however, holds in for a short delay period due to its time release factor, thus allowing the armature of the motor 8 to complete its stroke. When, however, the relay A' falls, the motor 8 is de-energised, and the motor armature re-makes the contacts 9. This re-energises the relay A', and hence the motor 8, so that the motor continues to operate, rotating the setting arm 6 step-wise at each operation. Simultaneously, through contacts A2 and the strapped contacts Nos. 1–6 on the level PSL2 of the programme uni-selector PS, the driving magnet CSM of the counting uni-selector CS is intermittently energised, and its wipers W9 and W10 are stepped round in unison with the setting arm 6.

This step-by-step motion of both the setting arm 6 and the counting uni-selector wipers continues until the live contact No. 10 on the level CSL1 is reached by its wiper W9. When this occurs, the relay B' is energised and various operations are effected. First, the contacts B1 are opened to de-energise the relay A', so that no further operation of the setting arm motor 8 takes place.

Secondly, the contacts B5 are closed, and a hold-on circuit is completed through the normally closed side of the make-before-break contacts D2. The relay B' thus remains energised, and at the same time the positive main is connected through the normally closed side of make-before-break contacts C3 to the "start feed" button SF.

Closure of the contacts B2 connects the positive main to the contacts on level CSL2, all of which are strapped together except contact No. 0. The wiper W10 on this level is connected through the self-drive contacts 25 of the counting uni-selector to the driving magnet CSM, so that the uni-selector "homes" to its zero position, and is in readiness for the next period of adjustment of the setting arm 6.

Contacts B3 are closed of energisation of the relay B' to connect a convenient source of power supply to the wiper W8 on level PSL4 of the programme uni-selector PS. The first six contacts—excluding contact No. 0—of this level are connected to respective indicator lamps H1, H2, H3, H4, H5 and H6 whose terminals are connected to the common return of the supply. Each lamp is illuminated in turn when the setting arm 6 has reached a position in accordance with the weight of material to be discharged from the corresponding hopper, and serves to indicate to the operator that the discharge operation can be initiated. This is effected by pressing the "start feed" button SF, which, through the circuit already described in connection with Fig. 3, energises relay C'. This relay operates the make-before-break contacts C3 to complete its own hold-on circuit, which remains complete so long as the relay D' is de-energised.

Energisation of the relay C' closes the contacts C1 which connect the positive main to the wiper W7 on level PSL3. This wiper now stands on contact No. 1 on this level, and so energises the winding M1 of a motor or solenoid which controls the outlet of the first hopper. The arrangement of apparatus controlled by the motor may be as shown in Fig. 1. Material is thus discharged from the selected hopper, into the receptacle 4 (Fig. 1), and the measuring arm 2 follows up the setting arm 6, as in the example already described. Simultaneously the contacts C2 are closed and illuminate a tell-tale lamp T which indicates that a hopper is discharging.

As soon as the measuring arm 2 comes into the position of coincidence with the setting arm 6, the contacts 7 on the setting arm are closed and the relay D' is energised through the contacts B4, which are still closed by the relay B'. The relay D' operates the make-before-break contacts D2 which energise the driving magnet PSM of the programme uni-selector. The hold-on circuit of the relay B' is now broken at these contacts, and both this relay and the relay C' are de-energised. The opening of contacts C2 extinguishes the tell-tale T, while the opening of contacts C1 de-energises the hopper control motor M1. The relay D' is de-energised by the opening of contacts B4.

When the relay D' releases, the make side of the make-before-break contacts D2 opens, thus de-energising the programme uni-selector PS and causing the wipers to move round one step on to their respective contacts No. 2. The circuit is now prepared for the next adjustment of the setting arm 6 which, it will be noted, is still in its first setting position. The arm 6 does not return to zero between successive weighings of a programme.

This progressive setting of the arm 6, and the cycle of operations associated therewith, continues until the wiper W6 on level PS12 passes from the contact associated with the last weighing in a programme—in the example quoted, this is contact No. 6. All the remaining contacts on this level are strapped together and connected direct to the self-drive contacts 33 of the programme uni-selector PS, so that this uni-selector "homes" to its zero position. At the same time, the relay A' is impulsed through the previously described circuit including contacts E1, B1 and D1, so that the motor 8 is operated to move the setting arm 6 round stepwise until the zero contacts 10 on support 11 are closed to energise the relay E'. This relay opens the contacts E1 and stops any further impulsing of the relay A'. The circuit to the driving magnet CSM is open through programme starting button SP, and hence the complete circuit is in readiness for carrying out another programme of weighing.

It will be understood that in apparatus such as that shown in Fig. 4 for automatically controlling a sequence of weighing operations, no weighing operation is initiated until the previous weighing operation has been completed and the setting arm has been advanced to its new position. Similarly, a new sequence of operations cannot be initiated until the previous sequence has been completed and the control gear re-set to its zero position.

The rotary programme selector switch PS may be replaced by any other convenient form of automatic selecting mechanism; for example, a chart constituted by a strip of insulating material having a number of perforations therein, each representing an individual material, the chart being arranged to be advanced stepwise over a conducting surface and a plurality of contact fingers being arranged to engage the chart and to make contact with the conducting surface beneath it whenever a perforation is presented to the respective finger. Furthermore, a further number of contact fingers may cooperate with the chart, each representing a unit of load while corresponding perforations are formed in the chart to correspond with the various operation perforations, to determine the quantity of material to be delivered at each operation. Other forms of chart may also be used as will be understood.

In weighing mechanism as shown in Fig. 1 in which rotation of the pointer—and hence of the measuring arm 2—through substantially 360 degrees represents a weight of 100 lbs., the successive steps of the ratchet driving motor 8 may be selected to represent intervals of weight of 2 lbs. In the corresponding arrangement of Fig. 2 embodying a continuously rotatable motor 8', the segments of the commutator 16 may be similarly arranged to produce 50 impulses for a rotation of the setting arm 6 through the same angular deflection as the pointer. Where closer sub-division of the weight is required, the number of teeth on the ratchet wheel of the motor 8 (Fig. 1) or the gearing between the driving motor 8' and the commutator 16 (Fig. 2) may be modified accordingly.

Where it is desired that the automatic control mechanism should exert no restraint on the weighing mechanism, an optical transmission system for determining the coincidence in position of the measuring arm on the setting arm may be employed. Such a system is shown in Fig. 5 of the drawings. The measuring arm 2 is provided with two mirrors 34, 35, each set at 45 degrees to the length of the arm 2, the centre of the reflecting surface of one mirror 34 lying on the axis of the pointer spindle 3, while the other mirror is located on the extremity of the measuring arm. The reflecting surface of both mirrors are directed outwardly, and are arranged so that a light beam I from a light source 36 located on the axis, produced, of the pointer spindle 3 and directed towards it, strikes the surface of the first mirror 34 and is reflected at $I_1$ parallel to the measuring arm 2 on to the mirror 35 at the extremity thereof. Thence the light beam is again reflected at $I_2$ parallel to the incident beam I from the light source and in the opposite direction.

The setting arm 6 carries at its extremity a mirror 37 set at 45 degrees to the length thereof to receive the light beam $I_2$ from the mirror 35 and reflect it at $I_3$ towards the axis of the setting arm. At this point the beam $I_3$ strikes a second mirror 38 carried on the setting arm 6 and set parallel to the mirror 37 so as to reflect the beam $I_4$ along an axial bore 5a through the spindle 5 carrying the setting arm 6. The reflected beam I₄ emerges from the far end of this bore 5a and impinges upon a photo-electric cell 39 controlling a relay (not shown) having contacts which correspond to the contacts 7 in the arrangement of Fig. 1.

In this arrangement it will be seen that the photocell 39 becomes illuminated only when the measuring arm 2 and the setting arm 6 are in positions of coincidence. In this way, the automatic control mechanism is operated in similar manner to the arrangement described above. The mirrors 34, 35, 37 and 38 may be set at any desired angles so that if necessary the axes of rotation of the measuring and setting arms 2, 6 may be displaced with respect to each other.

What I claim is:

1. In automatic weighing apparatus having relatively movable weight setting and weight measuring members which co-operate to determine the quantity of material delivered at each weighing, the provision of mechanism for controlling the position of the weight setting member comprising an electrical impulse generator coupled to said weight setting member for generating impulses representing increments of weight of the material to be delivered, and an impulse counter for controlling the displacement of the weight setting member at the commencement of each automatic weighing cycle.

2. Automatic weighing apparatus comprising co-operating weight setting and weight measuring members, an electrical impulse generator coupled to the weight setting member, a motor for driving the weight setting member, a first uniselector to be energised by the said electrical impulses, a relay to control the said motor and connectible to any one of a plurality of channels through a contact level of the first uniselector, a plurality of material delivery devices, a second uniselector for energising said devices in a predetermined sequence and for controlling the connection of the said relay to the channels through the contact level of the first uniselector, and means for stepping the second uniselector round by one contact at the end of each weighing cycle.

3. Automatic weighing apparatus comprising an electrical impulse generator operable in accordance with the quantity of material to be delivered in a weighing cycle, a step-by-step counter relay energised by said generator for determining the weight setting of the apparatus for each successive weighing cycle, a plurality of material delivery devices, a programme uniselector switch for controlling the operation of said devices over a number of automatic weighing cycles, and a circuit connection between said programme uniselector and the step-by-step counter relay for varying the weight setting of the apparatus for one cycle to another in accordance with a predetermined programme of deliveries from the several material delivery devices.

4. Automatic weighing apparatus as claimed in claim 3 wherein the weight setting of the apparatus is progressively advanced from one weighing cycle to the next.

5. In automatic weighing apparatus, co-operating movable weight setting and weight measuring members, means for controlling the feed of material to the weighing apparatus, an electrical circuit governing the operation of the feed control means, a circuit control element operable, when the said co-operative movable members are brought into register, to energize said circuit to bring about an interruption in the feed of material to be weighed, a motor for positioning the weight setting member in accordance with a desired weight of material, an electrical impulse generator associated with said motor for generating impulses representing given increments of weight of material, and an impulse counting mechanism for stopping said motor when said weight setting member has reached the desired position.

6. Automatic weighing apparatus comprising a weight setting member displaceable in accordance with the desired weight of material to be delivered at a given weighing operation, a co-operating weight measuring member displaceable in accordance with the weight of material delivered, means for controlling the feed of material to the weighing apparatus, an electrical circuit governing the operation of the feed control means, a circuit control element operable, when the said co-operating movable members are brought into register, to energize said circuit to bring about the cutting off of further feed of said material when the said members attain positions of mutual register, a motor for controlling the displacement of the weight setting member, an electrical impulse generator coupled to said weight setting member, and a step-by-step counter adapted to be energized by the impulses from said generator and operative to stop the weight setting motor when the number of impulses representing a desired weight of material has been counted.

7. Automatic weighing apparatus having a weight setting and a weight measuring member, means for controlling the feed of material to the weighing apparatus, an electrical circuit governing the operation of the feed control means, a circuit control element operable to detect mutual registration of the positions of the said members, and means for presetting the weight setting member in accordance with the desired quantity of material to be weighed, the said members being constituted by parallel arms rotatable about a common axis perpendicular thereto, a light source associated with one arm and a photo-electric device associated with the other arm, and light reflecting surfaces adjacent the extremities of the arms for directing light rays from the said source onto the said photo-electric device when the arms are in register.

8. Automatic weighing apparatus comprising a weight setting member displaceable in accordance with the desired weight of material to be delivered at a given weighing operation, a cooperating weight measuring member displaceable in accordance with the weight of material delivered, means for controlling the feed of material to the weighing apparatus, an electrical circuit governing the operation of the feed control means, a circuit control element operable, when the said co-operating movable members are brought into register, to energize said circuit to bring about the cutting off of further feed of said material when the said members attain positions of mutual register, a motor for controlling the displacement of the weight setting member, an electrical impulse generator coupled to said weight setting member, and a step-by-step counter adapted to be energized by the impulses from said generator and operative to stop the weight setting motor when the number of impulses representing a desired weight of material has been counted, and means provided for pre-selecting the desired number of impulses on the counting means and the counting means being self-resetting to starting position preparatory to a further counting operation.

9. Automatic weighing apparatus comprising a weight setting member displaceable in accordance with the desired weight of material to be delivered at a given weighing operation, a cooperating weight measuring member displaceable in accordance with the weight of material delivered, a circuit control element operable by said weight setting and weight measuring members for cutting off further delivery of said material when the said members attain positions of coincidence, a motor for controlling the displacement of the weight setting member, an electrical impulse generator coupled to said weight setting member, and a step-by-step counter comprising a uni-selector switch having a plurality of channels through a contact lever thereof, a relay for controlling the energization of the weight setting motion, and a presettable selector switch for connecting said relay to any one of said channels, and said step-by-step counter adapted to be energized by the impulses from said generator and operative to stop the weight setting motor when the number of impulses representing a desired weight of material has been counted.

10. Automatic weighing apparatus as claimed in claim 9 wherein the presettable selector switch is constituted by a contact lever on a second uni-selector, and relay means is provided for stepping said second uni-selector round one position at the end of each weighing cycle for presetting the weight of material to be discharged at the next weighing cycle.

11. Automatic weighing apparatus having a weight setting and a weight measuring member, a circuit control element for detecting coincidence between the positions of the said members, and means for presetting the weight setting members in accordance with the desired quantity of material to be weighed, wherein the said members are constituted by parallel arms rotatable about a common axis perpendicular thereto, a light source associated with one arm and a photoelectric device associated with the other arm, and light reflecting surfaces adjacent the extremities of the arms for directing light rays from the said source on to the said photoelectric device when the arms are in coincidence, and both the light source and the photoelectric device being located on the common axis about which the arms rotate, the said device being shielded from direct radiation from the source along the said axis, each arm being provided with a reflector mounted thereon at the axis of rotation for directing the light rays radially outwards along one arm so as to be reflected from the extremity thereof to the extremity of the other arm, so that the rays are directed radially inwards to the reflector at the axis of rotation thereof and from the latter reflector to the photoelectric device.

12. Apparatus for automatically delivering predetermined weights of material comprising a weighing mechanism having a load carrier for receiving the weight of material, a weight measuring member whose position relative to a zero position is a function of the weight of material on the load carrier, and a cooperating setting member movable in accordance with the value of the predetermined weight and carrying an electrical contact operable by the measuring member when the two said members are brought to positions corresponding to the same weight, means for delivering material to the load carrier, and a plurality of pre-selecting devices determining the weights of material to be delivered in a series of successive weighing operations and a plurality of material delivery devices for discharging material into the load carrier of the weighing mechanism in a series of successive operations, and means for controlling the discharge of material from each source in succession in dependence upon the setting of the several pre-selecting means.

References Cited in the file of this patent
UNITED STATES PATENTS

| | | |
|---|---|---|
| 748,941 | Fessenden | Jan. 5, 1904 |
| 1,057,811 | Duffie | Apr. 1, 1913 |
| 1,133,167 | Mioton | Mar. 23, 1915 |
| 1,514,353 | Thomas | Nov. 4, 1924 |
| 1,529,155 | Blomquist | Mar. 10, 1925 |
| 1,876,512 | Pfening et al. | Sept. 6, 1932 |
| 2,059,514 | Frediani | Nov. 3, 1936 |
| 2,151,107 | Howard | Mar. 21, 1939 |
| 2,167,517 | Korber | July 25, 1939 |
| 2,193,594 | Johnson | Mar. 12, 1940 |
| 2,323,023 | Flanagan | June 29, 1943 |
| 2,430,113 | Handley | Nov. 4, 1947 |
| 2,515,412 | Lee | July 18, 1950 |
| 2,516,456 | Fischer | July 25, 1950 |
| 2,517,559 | Haigh et al. | Aug. 8, 1950 |
| 2,577,820 | Singleton | Dec. 11, 1951 |
| 2,581,204 | Reilly | Jan. 1, 1952 |
| 2,656,109 | Lindars | Oct. 20, 1953 |